United States Patent
Seymour

(10) Patent No.: US 7,212,842 B1
(45) Date of Patent: May 1, 2007

(54) PORTABLE ELECTRONIC APPARATUS

(75) Inventor: James Nicholas Seymour, Bristol (GB)

(73) Assignee: Nokia Corporation, Espoo (FI)

( * ) Notice: Subject to any disclaimer, the term of this patent is extended or adjusted under 35 U.S.C. 154(b) by 967 days.

(21) Appl. No.: 08/987,995

(22) Filed: Dec. 10, 1997

(30) Foreign Application Priority Data

Dec. 11, 1996 (GB) ................. 9625778.7

(51) Int. Cl.
- H04B 1/38 (2006.01)
- H04M 1/00 (2006.01)
- G01V 3/00 (2006.01)

(52) U.S. Cl. ............ 455/573; 455/572; 455/575.1; 340/855.8; 379/424

(58) Field of Classification Search ........... 455/572, 455/575, 410, 411, 67.1, 346, 573, 575.1, 455/90.3, 441; 340/825.54, 825.49, 572.1, 340/825.46, 825.45, 568.8, 689, 568.1, 545.5, 340/539, 426, 639, 855.8, 856.2, 856.3, 539.11; 379/445, 424, 446, 454, 42; 243/634, 551, 243/543

See application file for complete search history.

(56) References Cited

U.S. PATENT DOCUMENTS

| 3,930,249 | A |   | 12/1975 | Steck et al. ............ 340/280 |
| 4,137,521 | A |   | 1/1979  | Martinez ................ 340/63 |
| 4,316,181 | A |   | 2/1982  | Primont et al. .......... 340/571 |
| 4,806,926 | A |   | 2/1989  | Nakamura ............ 340/825.31 |
| 4,973,945 | A |   | 11/1990 | St. John ................ 340/571 |
| 5,327,482 | A | * | 7/1994  | Yamamoto ............... 455/465 |
| 5,479,486 | A | * | 12/1995 | Saji ........................ 379/61 |
| 5,542,105 | A |   | 7/1996  | Finch et al. ............. 455/89 |
| 5,578,991 | A | * | 11/1996 | Scholder ................ 340/571 |
| 5,748,084 | A | * | 5/1998  | Isikoff .................. 340/568 |
| 5,760,690 | A | * | 6/1998  | French .................. 340/571 |
| 5,872,515 | A | * | 2/1999  | Ha et al. ............... 340/571 |

FOREIGN PATENT DOCUMENTS

| GB | 2 243 117 B  | 4/1994 |
| WO | WO 96/18175  | 6/1996 |
| WO | WO 97/34408  | 9/1997 |

\* cited by examiner

Primary Examiner—Naghmeh Mehrpour
(74) Attorney, Agent, or Firm—Harrington & Smith, PC

(57) ABSTRACT

Portable electronic apparatus is disclosed having a sensor for sensing the portable electronic apparatus coupled in intimate proximity to a rest. The rest may be a desk top, car instrument panel top or a special stand for the portable electronic apparatus. The portable electronic apparatus also has an inhibitor which inhibits operation of or locks the portable electronic apparatus, when the sensor senses absence of intimate proximity to the rest.

13 Claims, 3 Drawing Sheets

PORTABLE ELECTRONIC APPARATUS

FIELD OF INVENTION

The present invention relates to portable electronic apparatus, particularly but not exclusively to portable radio telephones.

BACKGROUND OF INVENTION

Portable electronic apparatus such as personal organisers, portable computers, radio telephones and the like are common place. By virtue of their portability such electronic apparatus are easily misplaced or stolen. This makes such apparatus vulnerable to misuse by an unauthorised person, such as accessing personal or confidential information. More particularly, in the case of a radio telephone an unauthorised person is able to make telephone calls which are charged to the owner of the radio telephone, mischievously reset settings for the radio telephone or access personal or confidential information such as the telephone numbers of other telephone subscribers.

To overcome such problems it is known to provide portable electronic apparatus with security locks capable of being activated and/or deactivated manually by the use of passwords or codes for example, known only to authorised users of the apparatus. However, it is typically the case that a user places the apparatus in a charger or desk stand on their desk during normal use, and wishes to have the apparatus unlocked and available for use most of the time, such that they can be contacted on it. The user does not wish to bother themselves with activating any locks or security access codes for momentary absence from the apparatus, such as temporarily leaving their office However, such momentary absence still leaves the apparatus vulnerable to theft and misuse.

SUMMARY OF INVENTION

In accordance with a first aspect of the present invention, there is provided portable electronic apparatus comprising a sensor for sensing the portable electronic apparatus coupled in intimate proximity to a rest, and inhibiting means for automatically inhibiting operation of the portable electronic apparatus responsive to the sensor sensing absence of said intimate proximity to the rest.

In accordance with a second aspect of the present invention, there is provided a method for inhibiting unauthorised use of a portable electronic apparatus, comprising the steps of sensing the portable electronic apparatus coupled in intimate proximity to a rest, and automatically inhibiting operation of the portable electronic apparatus for absence of said intimate proximity to the rest.

Preferably, the sensor and locking means are operative for a power on mode of the portable electronic apparatus.

For example, the locking means may be adapted to inhibit access to information stored in the portable electronic apparatus. In this way the apparatus may be left switched on in or on the rest, such as a desk top or car instrument panel surface or base unit for example, without the risk of it being removed and tampered with. For example, a thief or unauthorised user is inhibited from using the apparatus and gaining access to confidential or personal information when the apparatus is moved away from the rest. Therefore, a user can momentarily be absent from the apparatus without needing to manually lock the apparatus, since persons are naturally disinclined to perform such use without first taking the apparatus away from its rest.

In one embodiment of the invention the portable electronic apparatus comprises a radio telephone.

In such an embodiment it is preferable for the locking means to be adapted to inhibit making an outgoing call from the radio telephone. Thereby, reducing the risk of high call charges being incurred due to unauthorised use.

Optionally, there may be further provided a memory means for storing subscriber identity information, wherein the locking means is adapted to inhibit access to subscriber identity information stored in the memory means.

Typically, the rest is a base unit. The apparatus may further comprise a rechargeable power supply, and the sensor be adapted to sense the portable electronic apparatus coupled in intimate proximity to a base unit comprising a charging unit.

Suitably, the sensor is adapted to sense a charging voltage applied to the portable electronic apparatus. The presence of the charging is indicative of the portable electronic apparatus being coupled in intimate proximity to a charger. Such operation is particularly suitable for apparatus for which is provided desk top charging units, in which a user typically leaves the apparatus when it is not in use.

Advantageously, the locking means is adapted to be responsive to a security code or password input to the portable electronic apparatus for deactivating the locking means. Thus, a user can move an apparatus away from the rest or base unit and take it away, and unlock the apparatus by inputting the appropriate code or key stroke sequence when the user wishes to use the apparatus. However, the portable electronic apparatus may still be operable in a passive mode, for example a radio telephone being capable of only receiving calls without the user needing to input a security code.

Optionally, a user may disable the invention via a menu option for example such that the apparatus is not automatically locked when moved from the rest or base unit.

Advantageously, the portable electronic apparatus may be automatically unlocked when it is placed back into intimate proximity with the rest.

DETAILED DESCRIPTION OF EMBODIMENTS OF THE INVENTION

Figure 1:
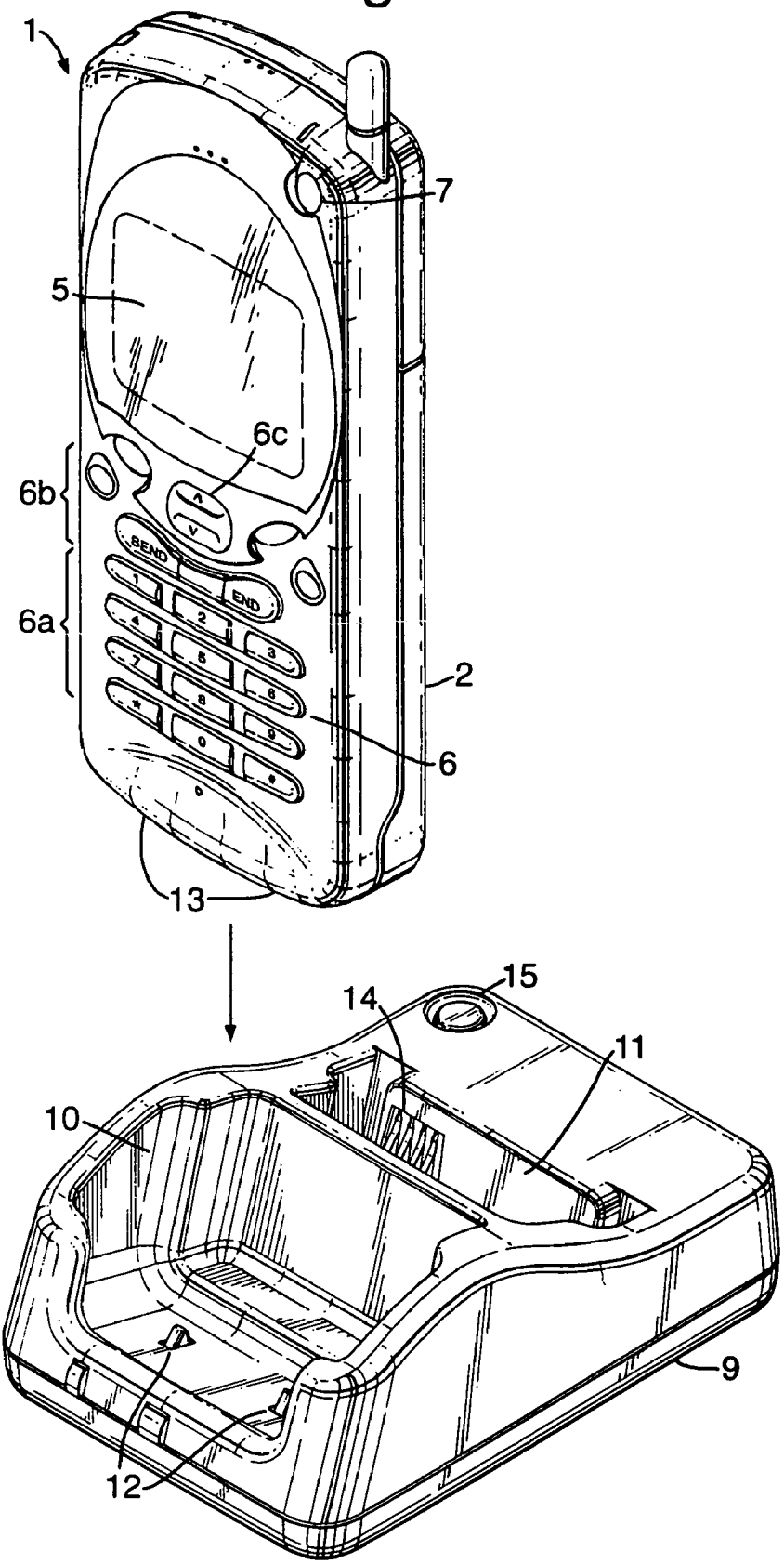
FIG. 1 is a perspective view of a cellular radio telephone and desk stand charger unit.
Figure 2:
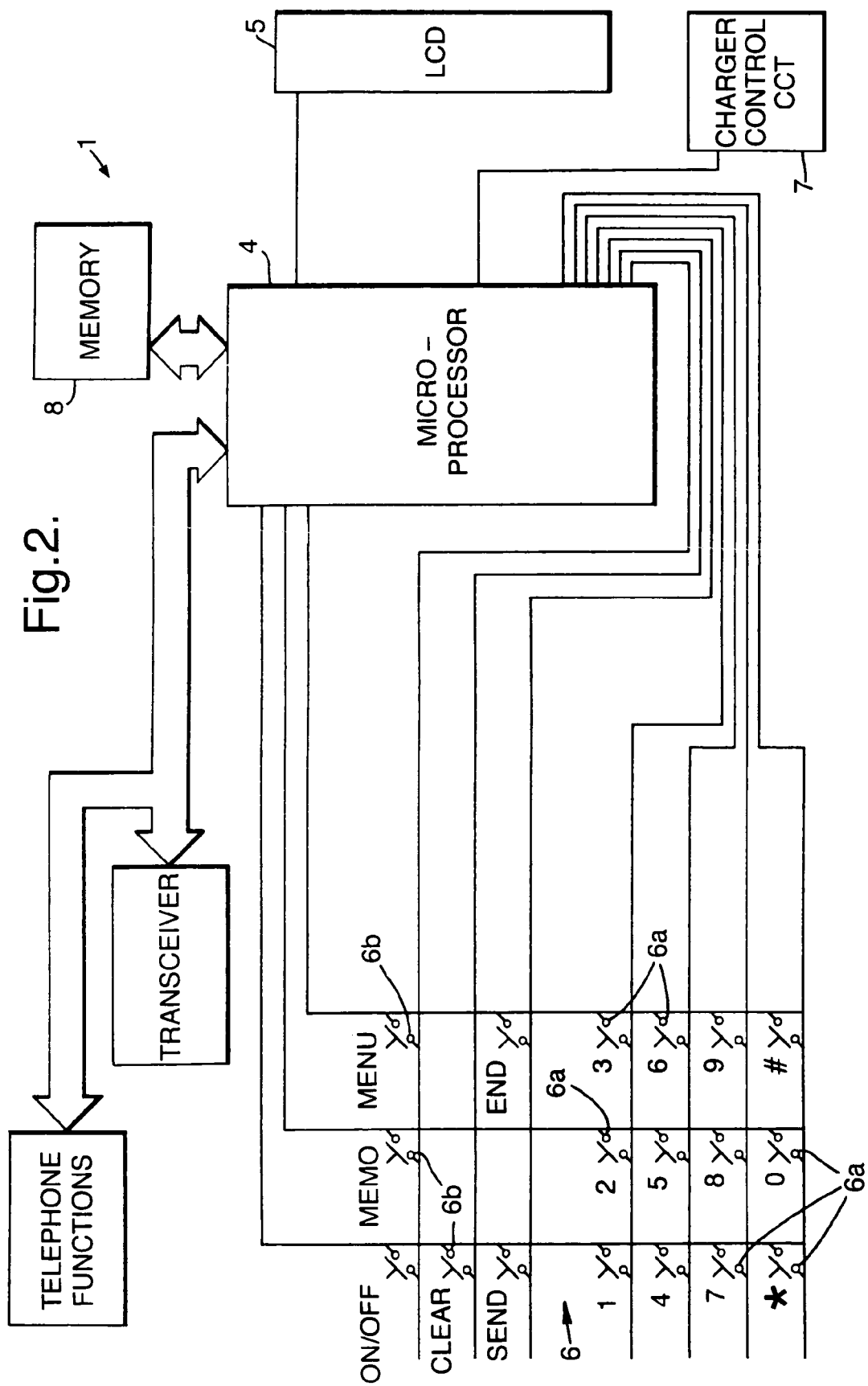
FIG. 2 is a schematic diagram of the main circuitry of the telephone in FIG. 1.

Specific embodiments in accordance with the invention are hereinafter described, by way of example only, with reference to the accompanying drawings, in which:

The portable radio telephone shown in FIG. 1 is a cellular telephone 1 powered by a rechargeable battery pack 2. The telephone 1 includes a transceiver and all the other features conventionally found in a cellular telephone, as shown schematically in FIG. 2. Also, since these aspects of the telephone are not directly relevant to the instant invention no further details will be given here, except to say that a single microprocessor 4 (see FIG. 2) is employed to control all the basic functions of the telephone 1 and to control the keypad and display functions. Alternatively, however, the telephone functions may be controlled by a master microcomputer, while the keypad and display functions are under the control of a separate slave microcomputer coupled to communicate with the master microcomputer. The telephone 1 also comprises a memory unit 8 for storing user definable data such as telephone numbers in a subscriber number index, or identity codes for telephone banking systems. A charger control circuit 7 is also included in telephone 1.

The user-interface of telephone 1 comprises a display, e.g. a liquid crystal display 5, itself well-known in the art and a keypad 6 on the front of the telephone 1. The display is coupled to and regulated by the microprocessor 4 in the usual manner. The keypad 6 essentially comprises two main sets of keys, namely alpha numeric keys 6a associated with alpha numeric data especially for dialing telephone numbers, but also (optionally) for entering alphanumeric data into the telephone memories, e.g. a subscriber number index, and a set of function keys 6b for enabling various predetermined functions or operations.

The keys 6a are arranged in four rows of three keys each. As is conventional for the numeric key layout of a telephone, the top row comprises keys for numbers 1, 2 and 3 respectively, the second row down for numbers 4, 5 and 6 respectively, the next row down for numbers 7, 8 and 9 respectively, and the bottom row for *, 0 and # respectively. Some or all of these keys may also be associated with alphabet information, as again is quite conventional. the alphabetic rather than numeric data is selected for example by preceding the alphanumeric keystroke with another predetermined keystroke or set of keystrokes, specifically using the function keys. Hence the alphabetic data mode may be enabled for example by preceding the particular keystroke with previously depressing a "MEMORY" or "STORE" key disposed among the function keys 6b.

As is usual in cellular telephones, the keys 6b include a "SEND" and "END" key for respectively initiating and terminating a telephone call. Another key 7, specifically located in the top left-hand corner is an "ON/OFF" key for turning the telephone on and off, i.e. by connecting and disconnecting the battery pack power supply. Another of the function keys may be a menu or function key 6c labelled, for example, "MENU", "FUNCTION" or up/down arrows or with a suitable abbreviation thereof. Depression of this key enables a variety of pre-set menus, the related instructions of which are stored in memory, to be viewed and selectively enabled.

Also shown in FIG. 1 is a desk stand or base unit charger 9. Deskstand charger 9 has cavities 10 and 11, respectively adapted to receive the telephone 1 and a spare battery pack 2. Charging contact pads 12, for contacting complementary pads 13 located at the bottom of telephone 1, are disposed at the bottom of cavity 10. Contact pads 12 couple a charging current via complementary pads 13 to battery pack 2 of telephone 1. Charging contacts 14 are also disposed in cavity 11, for charging a spare battery pack 2. Button 15 is a discharge button for providing a user with the facility to completely discharge battery pack 2 from time to time, in accordance with good battery maintenance practice.

Figure 3:
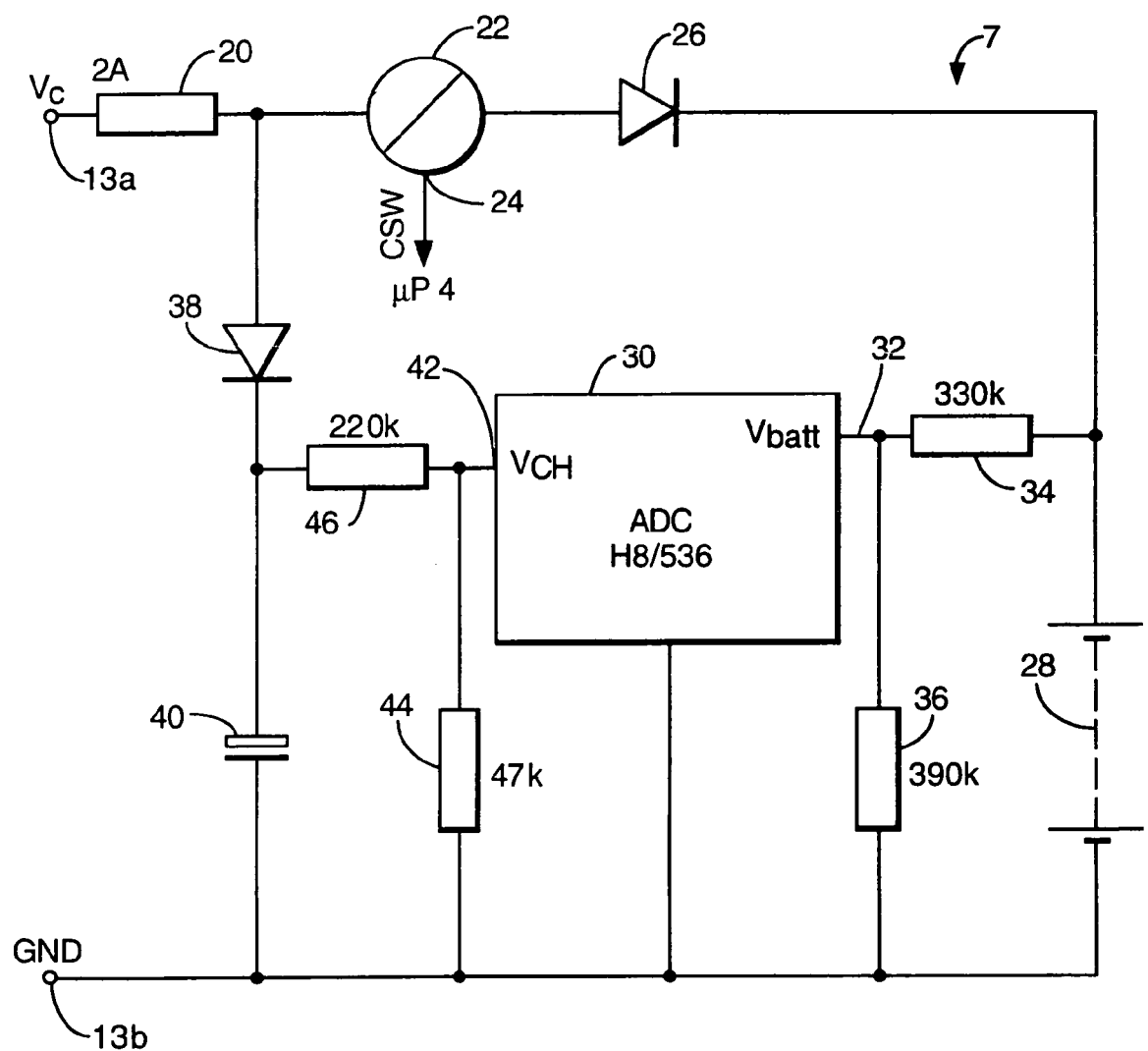
FIG. 3 is a schematic diagram of charger control circuitry relevant to the present invention.

FIG. 3 is a schematic diagram of charger control circuitry 7 relevant to an embodiment of the present invention. When telephone 1 is placed in charger 9, charging contact pads 12 contact complementary pads 13 and a charging current is supplied to telephone 1 via the pads 12, 13. Typically, one set of pads 12a, 13a are ground connections, and the other set of pads 12b, 13b are charging current connections.

A charging voltage $V_C$ appears across pads 13a, 13b. A charging current flows through circuit protection fuse 20 towards switch 22 comprising a power transistor type BCP 69-25. Switch 22 is under control of microprocessor 4 via Charger Switch (CSW) line 24, which acts to control the supply of charging current to the battery 28. Charging current is supplied to the battery terminals through type PRLL 581 diode 26. Diode 26 operates to inhibit discharge from battery 28 back through switch 22. Battery 28 typically comprises a plurality of individual cells, for example 5. Analogue to Digital Convertor (ADC) 30 may be included within microprocessor 4 which in the specific embodiment described herein is a type H8/536 made by Hitachi. Terminal 32 of ADC 30 is coupled to the positive terminal of battery 28 via 330 KΩ resistor 34, and to ground via 390 KΩ resistor 36 thereby forming a potential divider for monitoring battery voltage $V_{batt}$.

Charging current is also supplied to sampling diode 38 of type IMPII, and to 1 μF 35V sampling capacitor 40. Capacitor 40 holds a charge representative of the charging voltage $V_C$ supplied by the charger 9 to switch 22. ADC terminal 42 is coupled to capacitor 40 via a potential divider network comprising 220KΩ resistor 46 and 47KΩ resistor 44. The voltage, $V_{CH}$, supplied to terminal 42 is representative of charging voltage $V_C$.

Microprocessor 4 is conditioned to monitor $V_{batt}$ to ensure voltage limits for the battery 28 are not exceeded. Every 10 seconds microprocessor 4 activates CSW to turn swift 22 off in order to disconnect the charging current from the battery 28. The charger is disconnected for about 400 ms and the actual battery voltage recorded. Thus, the charging voltage supplied to the battery is monitored substantially continuously. Thus, microprocessor 4 in combination with ADC 30 provides a sensor for sensing the telephone 1 being coupled to a charger, and hence the telephone's intimate proximity to the base unit charger.

The microprocessor 4 controls many of the functions of telephone 1, and may be conditioned to inhibit operation of telephone 1 when $V_{batt}$ is not present or falls below a threshold, or is not preset or falls below a threshold for a predetermined period of time which in the described embodiment is longer than 400 ms. In order for the telephone 1 to be operable, a user must input a security code or special sequence of key strokes to unlock it. Telephone 1 may be inhibited to the extent that no telephone operations work and it is effectively in a "power off" mode. Optionally, the telephone 1 may only accept incoming calls, and inhibit the making of calls. This would prevent an unauthorised user, a thief for example, from making calls for which the owner of the telephone would be charged. The telephone 1 may also lock access to sensitive information stored in it, such as telephone numbers of third parties stored in memory unit 8. Access to voice mail or the ability to change settings for the telephone, such as divert status, security codes, may also be inhibited.

A key "Key Guard" feature, disclosed in UK patent application 9008921.0 and published as GB 2 243 117, may be activated on removal of the telephone from intimate proximity with the base unit. Such a "Key Guard" acts to render just the keypad, including function keys and power key, inoperative.

When the telephone 1 is resting in base unit charger 9, it may be on or off. Typically, when telephone 1 is off, i.e. the transceiver is not operable, various low power operations occur as well as the possibility of charging occurring. Thus, even in a "power off" mode telephone 1 may be configured to inhibit operation such as "power on" when it is removed from the base unit. Optionally, if a user has not activated a password mode for "power on", such a "password" mode can be activated when the telephone is removed from the base unit.

The foregoing described embodiments in accordance with the invention, utilise indirect and direct sensing of the portable electric apparatus being coupled in intimate proximity to the rest. For example, a sensor such as a microswitch may be disposed on the portable electronic apparatus itself, or on the rest. Signals indicative of intimate proximity may then be sensed by the sensing means.

In view of the foregoing description it will be evident to a person skilled in the art that various modifications may be made within the scope of the invention.

For example, charging may be inductive charging and the pads 13 of telephone 1 need not be in mechanical contact with pads 12 of a charger. Optionally, the telephone may be connected to a simple charger cable by means of a jack plug for example. In an optional embodiment, the telephone need not be coupled or proximal to a charger, but instead the telephone 1 may be provided with a simple stand or base unit. Sensing of intimate proximity of the telephone to the stand may be achieved by a microswitch and complementary member respectively located in the telephone and base unit, or vice versa. Intimate proximity of the telephone and base unit may also be sensed by means of capacitative coupling between elements respectively disposed in the telephone and base unit, or vice versa.

Optionally, a microswitch or light sensor could be disposed on a face of the telephone, e.g. a back face, such that when the telephone was placed with this face down onto a table or other surface serving as the rest for the telephone, intimate proximity of the telephone to that surface or table could be determined. When the telephone is removed from the table etc. operation of the telephone is inhibited. Other forms of sensor may be applicable.

Although an embodiment of the invention has been described by way of example with reference to a telephone, the present invention is equally applicable to other types of portable electronic apparatus.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

The invention claimed is:

1. A radio telephone including a rechargeable power supply and having coupling means for connecting to a charging unit for charging the rechargeable power supply, the radio telephone comprising sensing means associated with the coupling means and operable to sense the absence or the presence of the charging unit being connected to the radio telephone, and inhibiting means configured to be responsive to the sensing means in such a manner that when the sensing means senses absence of the charging unit the inhibiting means automatically inhibits operation of the radio telephone.

2. A radio telephone according to claim 1, wherein the sensor and the inhibiting means are operative for a power on mode of the radio telephone.

3. A radio telephone according to claim 1, wherein the inhibiting means is adapted to inhibit access to information stored in the radio telephone.

4. A radio telephone according to claim 1, wherein the inhibiting mean is adapted to inhibit making an outgoing call from a radio telephone.

5. A radio telephone according to claim 1, further comprising a memory means for storing subscriber identity information, wherein the inhibiting means is adapted to inhibit access to subscriber identity information stored in the memory means.

6. A radio telephone according to claim 1, wherein the sensor is adapted to sense a charging voltage for charging the rechargeable power supply of the radio telephone.

7. A radio telephone according to claim 1, wherein operation of the radio telephone is restorable responsive to a security code input to the radio telephone.

8. A method for inhibiting unauthorized use of a radio telephone comprising the steps of sensing at the radio telephone whether the radio telephone is coupled to a charging device and automatically inhibiting operation of the radio telephone responsive to sensing absence of the charging device.

9. The method of claim 8, wherein automatically inhibited operation is operative for a power on mode of the radio telephone.

10. The method of claim 8, wherein automatically inhibiting operation comprises particularly inhibiting access to information stored in the radio telephone.

11. The method of claim 8, wherein automatically inhibiting operation comprises particularly inhibiting making an outgoing call from a radio telephone.

12. The method of claim 8, wherein automatically inhibiting operation comprises particularly inhibiting access to subscriber identity information stored in the radio telephone.

13. The method of claim 8, further comprising:
    responsive to a security code input to the radio telephone, restoring the automatically inhibited operation.

\* \* \* \* \*